(12) United States Patent
Jha et al.

(10) Patent No.: US 6,190,625 B1
(45) Date of Patent: Feb. 20, 2001

(54) FLUIDIZED-BED ROASTING OF MOLYBDENITE CONCENTRATES

(75) Inventors: Mahesh C. Jha, Golden; William A. May, Boulder, both of CO (US)

(73) Assignee: Qualchem, Inc., Golden, CO (US)

( * ) Notice: Under 35 U.S.C. 154(b), the term of this patent shall be extended for 0 days.

(21) Appl. No.: 08/907,373

(22) Filed: Aug. 7, 1997

(51) Int. Cl.⁷ .............................. C01G 39/02; C22B 1/10
(52) U.S. Cl. ............................ 423/53; 266/172; 423/659
(58) Field of Search ................................ 266/172, 175, 266/176; 422/146; 423/53, 606, 659 F

(56) References Cited

U.S. PATENT DOCUMENTS

| | | | |
|---|---|---|---|
| 2,371,619 | * | 3/1945 | Hartley ................................ 266/172 |
| 2,404,944 | * | 7/1946 | Brassert ............................... 266/172 |
| 2,637,629 | * | 5/1953 | Lewis .................................. 423/542 |
| 2,756,986 | * | 7/1956 | Schytil et al. ........................ 266/159 |
| 3,455,677 | | 7/1969 | Litz ..................................... 75/419 |
| 3,656,933 | * | 4/1972 | Wolf et al. ........................... 423/148 |
| 3,745,668 | * | 7/1973 | Vian-Ortuno et al. ................ 34/589 |
| 3,798,306 | | 3/1974 | Lapat et al. .......................... 423/50 |
| 3,897,546 | * | 7/1975 | Beranek et al. ...................... 423/659 |
| 3,941,867 | | 3/1976 | Wilkomirsky et al. ............... 423/53 |
| 4,409,101 | | 10/1983 | Salikhov et al. ..................... 210/266 |
| 4,626,279 | * | 12/1986 | Bjornberg et al. ................... 423/22 |
| 5,133,137 | * | 7/1992 | Petersen ............................... 34/576 |
| 5,876,679 | * | 3/1999 | D'Acierno et al. .................. 422/143 |

FOREIGN PATENT DOCUMENTS

0 274 187 A2    10/1987 (EP).

OTHER PUBLICATIONS

Wilkomirski, I.A., A.P. Watkinson, J.K. Brimacombe, *Recirculating fluidized-bed process for the roasting of molybdenite concentrates*, Institute of Mining and Metallurgy; Dec. 1975, pp. C197–c205.

*Roasting of Molydbenite*, pp. 316–326.

Zelikman, A.N., L.V. Belyaevskaya, G.M. Vol'dman, and T.E. Prosenkova; *Fluidized Bed Roasting of Granulated Molybdenite Concentrate*; pp. 65–70.

Lindsay, D.G.; *Endako Roasting Practice*; The Metallurgical Society of CIM; Annual vol. 1977; pp. 32–36.

* cited by examiner

Primary Examiner—Shrive Beck
Assistant Examiner—Frederick Varcoe
(74) Attorney, Agent, or Firm—Marsh, Fischmann & Breyfogle LLP

(57) ABSTRACT

The present invention provides a method for fluidized bed roasting of molybdenite to molybdenum trioxide. A fluid bed reactor separated into separate zones is used to provide plug flow conditions. A cooling tube is submerged in the fluid bed to control temperature. A vibrator is used to enhance fluidization.

24 Claims, 2 Drawing Sheets

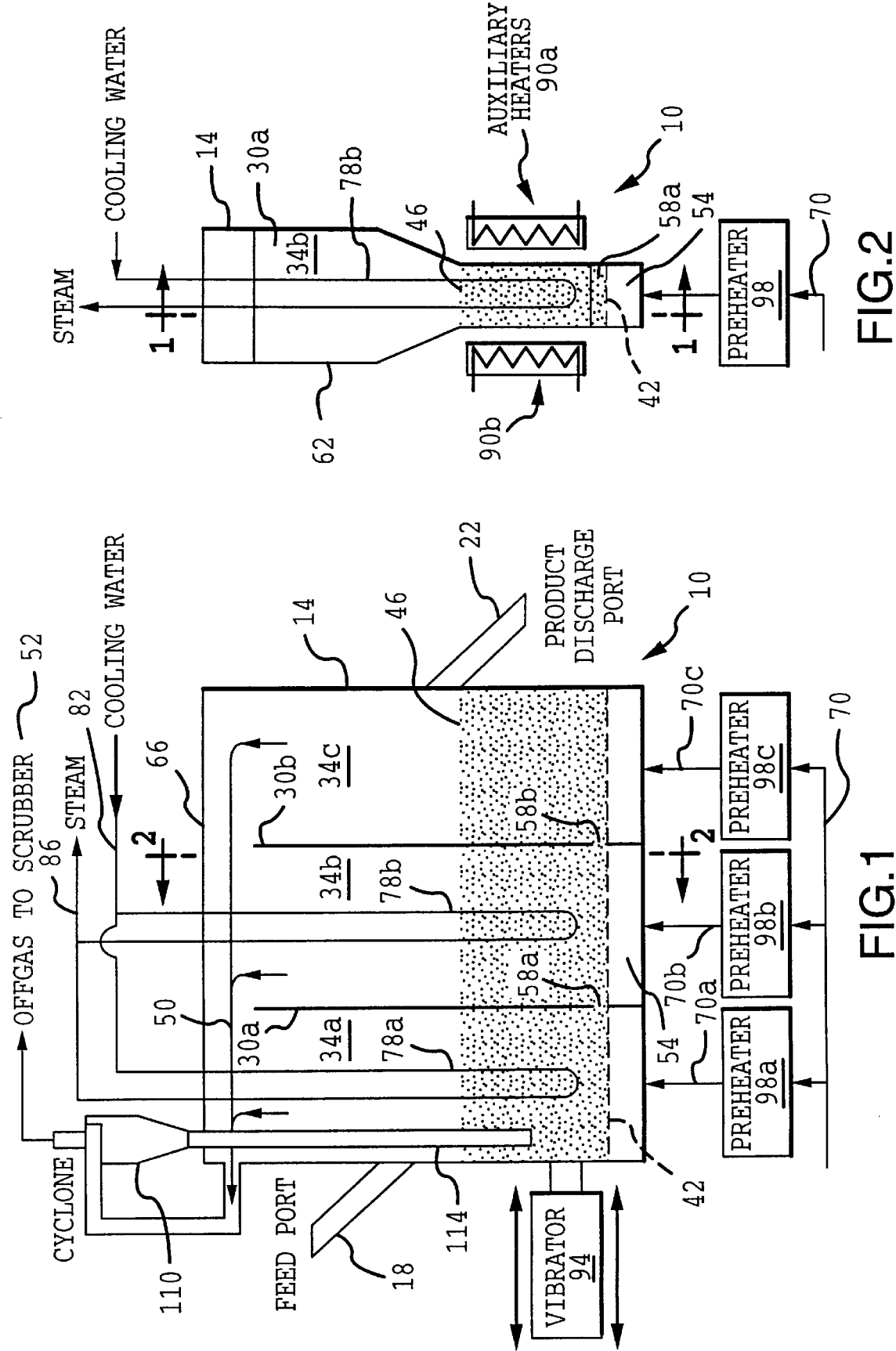

FLUIDIZED-BED ROASTING OF MOLYBDENITE CONCENTRATES

FIELD OF THE INVENTION

The present invention is directed generally to fluidized-bed roasting and specifically to fluidized-bed roasting of molybdenite concentrates.

BACKGROUND OF THE INVENTION

Molybdenum oxide, particularly $MoO_3$, is widely used as a raw material in the manufacture of stainless and low alloy steels, pure molybdenum metal, superalloys, catalysts, and specialty chemicals. Molybdenum oxide is commonly produced from molybdenum sulfides, particularly molybdenum concentrates, that are obtained by grinding copper or molybdenum ores and concentrating the sulfides contained therein.

To convert molybdenum sulfide to molybdenum oxide, molybdenum sulfide is typically air roasted in a multiple-hearth roaster according to the following overall reaction:

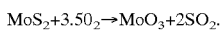
$MoS_2 + 3.5O_2 \rightarrow MoO_3 + 2SO_2$.

In multiple-hearth roasters, a static bed of feed material containing the molybdenum sulfides is calcined by an oxidizing gas (air) at temperatures ranging from 550 to over 700° C. To avoid severe fusion of the bed, operators periodically mix the bed manually to maintain bed porosity and permeability at desired levels.

In designing a more efficient roaster for molybdenum sulfide concentrates, there are a number of important considerations. By way of example, the roaster should be continuous and produce a uniform quality, low-sulfur molybdenum oxide product. To reduce the capital and operating costs of gas handling and acid plants, it is desirable to minimize the use of excess air and thereby produce a roaster off-gas containing a relatively high concentration of $SO_2$. Second, the roaster should be capable of automated operation to provide reduced operating costs. In other words, the roaster design should allow automated process control at operating conditions that will allow long operating times without downtime for cleaning and maintenance. Third, the roaster should recover heat energy released during sulfide oxidation as steam for useful purposes. Fourth, the roaster should have relatively few moving parts to improve system reliability, simplify system operation and decrease downtime and maintenance costs. Fifth, the roaster should provide for substantially uniform distribution of heat of reaction throughout the bed. The existence of temperature gradients in the bed can create hot zones where high temperature can cause partial fusion and sintering of the bed and volatilization of molybdenum oxide. Sixth, the roaster should have little, if any, refractory lining. Refractory lining can cause molybdenum loss (via molybdenum penetration into the refractory lining) and product contamination. Seventh, the roaster should eliminate the formation of hard crusts of molybdates and oxides. Such crusts can erode moving parts (e.g., rabble arms and teeth in conventional multiple-hearth roasters) and increase operating costs through increased labor to clean the roaster. Eighth, the roaster off-gas should have little, if any, dust entrainment to minimize product loss and downstream gas cleaning costs. Ninth, the roaster should be capable of handling feed materials comprising impurities, such as calcium, copper, iron and rhenium without operational problems. Finally, the roaster should operate at a temperature low enough to retard the volatilization of molybdenum trioxide and later condensation of the molybdenum trioxide in cooler pipes. Such condensation can cause operational and maintenance problems and reductions in product yields.

SUMMARY OF THE INVENTION

It is an objective of the present invention to provide a continuous roasting apparatus and method that can produce a uniform quality molybdenum oxide product at relatively low operating and capital costs. Related objectives include providing a roasting apparatus that is amenable to automatic process control; recovers energy released during sulfide oxidation; has few moving parts; has no refractory lining; can eliminate the formation of hard crusts of sintered molybdates and oxides, minimizes dust entrainment in the roaster off-gas, can handle feed materials comprising impurities without operation problems and can retard the volatilization of molybdenum trioxide.

These and other objectives are addressed by the present invention which provides a fluidized bed, roasting apparatus including:

(a) a chamber (e.g., a fully enclosed housing) for containing a bed of a feed material including molybdenum sulfides, such as molybdenite concentrates, the chamber having a feed port for introducing the feed material including molybdenum sulfides into the bed and a discharge port for removing the product from the bed;

(b) fluidizing means (e.g., a blower and connected ductwork) for contacting a fluidizing gas such as air with the bed to convert the molybdenum sulfides into molybdenum oxides, such as $MoO_3$, and sulfur oxides, such as $SO_2$.

(c) cooling means (e.g., a cooling tube containing a cooling fluid such as water) for removing the heat generated by the roasting reaction and thereby maintaining the bed at a desired temperature.

Because the conversion of molybdenum sulfides to molybdenum oxides is strongly exothermic, the cooling means closely controls the fluidized bed temperature. The cooling means can include a heat exchange fluid, such as water/steam, for recovering energy released during sulfide oxidation. The cooling means enables precise control of temperature at a set point which retards fusion and/or sintering of the materials in the fluidized bed, eliminates the need for a refractory lining, and retards volatilization of molybdenum trioxide. Preferably, the cooling means maintains the fluidized bed temperature below the sublimation and melting points of the molybdenum oxide and molybdate compounds that can form due to the presence of impurities. More preferably, the maximum fluidized bed temperature is less than about 580° C.

The roasting apparatus of the present invention has numerous advantages relative to conventional multiple hearth roasters. By way of example, the roasting apparatus of the present invention can be continuous, have a high throughput and relatively low capital and operating costs. The roasting apparatus can be amenable to automated process control, can handle feed materials comprising impurities such as calcium, copper, iron and rhenium without operation problems, and can have relatively few moving parts and therefore a high degree of system reliability and simplified system operation.

To eliminate gas channeling which causes pockets of unfluidized solids in the bed and to provide for a relatively high degree of fluidized bed porosity and permeability, the roasting apparatus can include vibratory means (e.g., a vibrator) for vibrating the bed during roasting. Preferably, the minimum amplitude of vibration of the vibratory means is about 1/16" and the maximum amplitude is about 1/2"

To inhibit entrainment of finely-sized feed material in the roaster off-gas, the chamber can have an expanded section at its upper end to provide for decreased velocity of the roaster off-gas. Entrained particles will return to the bed in response to the decrease in fluidizing gas velocity from the increased area of flow and decreasing gas temperatures due to heat losses from the upper roaster walls. Additionally, the apparatus can include gas/particulate separator means (e.g., a cyclone) to separate any remaining entrained particles from the roaster off-gas.

To provide for substantially uniform fluidizing gas (e.g., air) distribution and heat of reaction throughout the bed, the roasting apparatus can include a distributor plate located below the fluidized bed for distributing the fluidizing gas very uniformly across the bottom portion of the bed. Preferably the distribution plate has a plurality of pores for passage of the fluidizing gas, with the maximum distance between the centers of adjacent pores being about ¼ inch.

To provide for plug flow of the feed material as the material moves through the roasting apparatus, the apparatus can include one or more baffles to divide the chamber into a number of reaction zones. The baffle(s) extend above the distributor plate and have an opening which allows the feed material to move by plug flow from an upstream zone to an adjacent downstream zone. As will be appreciated, plug flow conditions ensure that each particle in the bed will have substantially the same residence time in each zone and therefore the same degree of conversion as it exits the roaster.

To provide for differing residence times in different reaction zones, the distributor plate and/or bottom member of the chamber can slope downwardly from the feed port to the discharge port. The sloping distributor plate provides for a bed of varying depths from zone to zone with the upstream zone(s) having a lesser bed depth (and therefore a lower residence time) than the downstream zone(s).

Because the percentage of unroasted sulfide decreases in each successive downstream zone, the quantity of oxygen required and exothermic heat generated also decreases. Therefore, the apparatus can include control means for independently controlling the fluidized bed temperature and fluidizing gas flow rate in each of the zones. Accordingly, each of the zones can have separate heaters, cooling means, and flow controllers to provide for differing fluidized bed operating conditions.

To further control fluidized bed temperature, the roasting apparatus can include a means for preheating the fluidizing gas before contacting of the fluidizing gas with the bed.

BRIEF DESCRIPTION OF THE DRAWINGS

FIG. 1 is a cross-sectional view of a fluidized bed roaster according to the present invention taken along line 1—1 of FIG. 2;

FIG. 2 is a cross-sectional view of the fluidized bed roaster taken along line 2—2 of FIG. 1;

DETAILED DESCRIPTION

Figure 4:
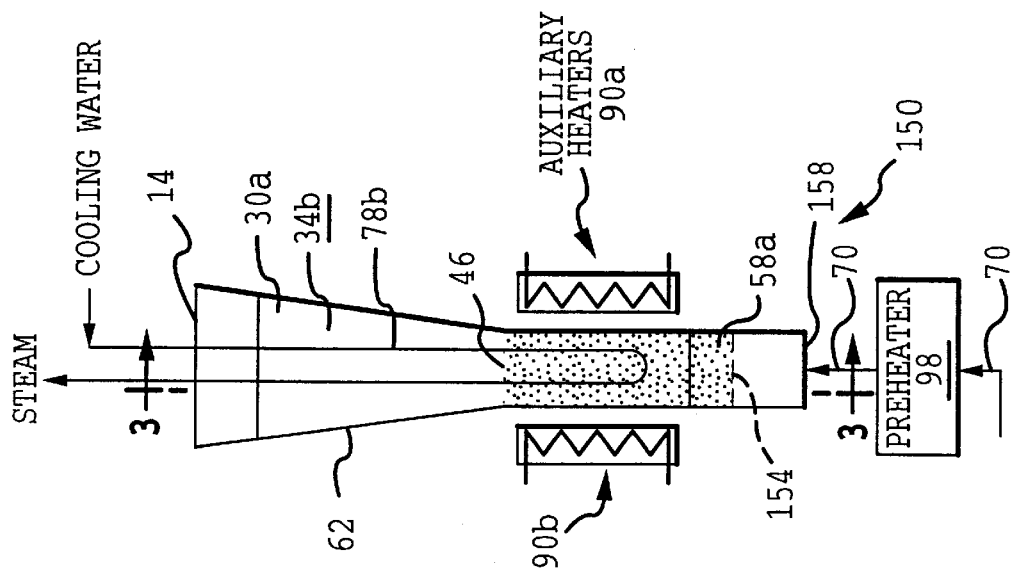
FIG. 4 is a cross-sectional view of the fluidized bed roaster taken along line 4—4 of FIG. 3.

The present invention is directed to a fluidized-bed roasting apparatus and method for converting sulfides to oxides at high conversion rates. Although the roasting apparatus can effectively oxidize any sulfide ore or concentrate, the process is particularly effective in roasting molybdenum sulfide containing feed materials such as molybdenite concentrates produced from copper or molybdenum ores and chemically produced $MoS_2$ or $MoS_3$ precipitates and mixtures thereof. They may contain impurities such as calcium, copper and iron. The molybdenum oxides produced by roasting can include molybdenum trioxide ($MoO_3$) and molybdenum dioxide ($MoO_2$), and mixtures thereof. Depending upon the feed material, the product may have a high enough purity to be sold as "Tech Oxide" or it can be converted to high-purity molybdenum chemicals.

An embodiment of the fluidized-bed roasting apparatus of the present invention is depicted in FIGS. 1–2. As will be appreciated, the actual dimensions and operating conditions of the roasting apparatus in FIGS. 1–2 can vary depending upon the desired throughput rate and feed characteristics.

The roasting apparatus or roaster 10 includes a rectangular chamber 14 having a feed port 18 for the feed material, a discharge port 22 for the product, vertical baffles 30a,b for dividing the chamber interior into multiple zones 34a–c, and a distributor plate 42. A fluidized bed 46 of particulate solids (feed material, product material and mixtures thereof) is located in the chamber 14 above the distributor plate 42. A plenum chamber 54 for distribution of the fluidizing gas is located below the distributor plate 42. The material moves from the feed end to the discharge end of the roaster through openings 58a,b in the baffles in a plug flow mode.

The interior of the chamber 14 is sealed from the ambient atmosphere to permit subatmospheric pressure operation and to inhibit release of potentially harmful byproduct gases into the atmosphere.

The feed port 18 may include a volumetric feeder or other similar device for providing a controlled feed rate of the feed material continuously to the portion of the fluidized bed 46 of material contained within the first zone 34a of the chamber 14.

The discharge port 22 may include a rotary valve or other similar device for discharging the hot calcined product from the last zone 34c of the chamber 14.

Referring to the end view shown in FIG. 2 to retard entrainment of finely sized particles in the roaster off-gas 50, the upper section 62 of the roaster chamber 14 is expanded to increase the internal cross-sectional area. As will be appreciated, molybdenite concentrates contain a wide particle size distribution from about 100 microns to 1 micron or less. The expanded upper section 62 provides for gradual reductions in the gas velocity to remove such finely-sized particles from the roaster off-gas 50.

Referring again to FIGS. 1 and 2 and as noted above to control operating conditions in different areas of the roaster, the interior of the roaster chamber 14 is divided into a plurality of zones 34a–c. The reaction conditions in each zone can be different due to differing sulfide contents of the portions of the bed 46 in each zone.

Each of the adjacent zones 34a–c is substantially isolated from adjacent zones to permit the reaction conditions in each zone to be independently monitored and controlled. Zone isolation is important to optimize the reaction conditions in each zone. To provide zone isolation, the upper portion of each of the baffles 30a,b extends from the distributor plate 42 to a point near a top panel 66 while a lower portion extends from the bottom of the distributor plate 42 to the bottom of the plenum chamber 54. Small openings 58a,b in the baffles allow movement of the material from one zone to the next in a plug flow mode. In this manner, the plenum chamber 54 is divided into separate sections, with each section corresponding to a zone. Although the optimum number of zones depends upon the characteristics of the feed material, it is generally preferable to have from about 3 to about 12 zones in a fluidized roasting reactor.

The distributor plate 42 has a relatively fine and tightly spaced hole pattern to provide for a fine dispersion of the fluidizing gas along the length of the bed 46 and therefore a substantially uniform distribution of the fluidizing gas 70*a–c* across the bottom of the bed 46 in each respective zone. The distributor plate 42 has a plurality of perforations or pores, with the maximum spacing between the centers of the perforations or pores being about 0.25 inches.

The finely dispersed and substantially uniform distribution of the fluidizing gas 70 along the length of the distributor plate 42 is important to maintaining bed porosity and permeability and controlling bed temperature. Molybdenum trioxide can react with other metal oxides (impurities) to form low melting point molybdates, which can aggregate and sinter the bed at temperatures even below 580° C. To complicate matters even further, oxidation of molybdenite is a highly exothermic reaction. A highly efficient distributor plate 42 overcomes this problem by distributing the fluidizing gas uniformly throughout the bed thereby eliminating pockets of unfluidized material from which the heat of reaction cannot be removed. Such pockets result in localized overheating leading to agglomeration and defluidization of the bed.

To provide temperature control, the upstream zones 34*a,b* include a cooling tube 78*a,b* for selective heat removal in the portion of the bed in each chamber 34*a,b*. The cooling tubes 78*a,b* are submerged in the bed 46 and configured such that the temperature of the bed in a specific zone is controlled by the respective tube 78*a,b*. It is important to provide the cooling tube surface substantially uniformly throughout the reaction zone. The shape of the cooling tube and its size depend, of course, upon the design and size of the individual zones. Thus, as shown in FIG. 1, each of the cooling tubes 78 can be a dip tube (or a cooling coil) extending from the top of the corresponding portion of the bed to the bottom.

Each of the cooling tubes 78*a,b* can be collectively connected to a single cooling fluid input line 82 for supplying a metered amount of cooling fluid to each of the tubes. Although many fluids can be used as a cooling fluid, the cooling fluid is preferably water, which is converted into steam when passing through the tube in response to the heat of reaction. The steam is removed via a common header 86 for other activities in the plant or for sale, as desired.

Alternatively, the tubes 78*a,b* can be connected to separate cooling fluid input lines to permit the supply of differing amounts of the cooling fluid to different zones. In this manner, the temperature in each of the zones can be independently controlled in response to different reaction conditions in each of the zones. This method of cooling the bed temperature is easily adapted to automatic computer control. Cooling tubes are unnecessary in the final zone 34*c* of roasting when very little heat is generated during the final stages of sulfur removal and molybdenum oxidation.

The temperature of the various zones of the fluidized bed is, of course, an important operational parameter. Molybdenite roasting is initiated at temperatures as low as 400° C., but the rate of roasting is still slow at 500° C. and increases rapidly as the temperature is increased above this point. Thus the temperature in the fluidized bed is maintained between about 500 and about 580° C. The optimum roasting temperature for each zone is dependent upon the feed composition. Depending upon the feed material composition, the zones can have different temperature profiles. The operating temperature in each zone can be independently controlled to substantially optimize process conditions for the bed material in that zone. Typically, heat must be added to the final zone 34*c* by preheating the fluidizing gas and if required heating the external walls of the reactor to maintain the desired temperature.

To heat the reactor walls, the final zone 34*c* can have separate heaters 90*a,b* (shown in FIG. 2) positioned adjacent to the zone to maintain the fluidized bed temperature at desired levels. Preferably, the heaters are separately controlled to reflect the differing heat requirements in the downstream zones. As will be appreciated, for some feed materials additional zones may require additional heat input via a heater.

At the recommended temperatures of operation, no more than about 580° C., it is feasible to use stainless steel for construction of the roaster without a refractory lining. This not only reduces the size and cost of the roaster, but allows for quick shutdown and startup of the roaster. Operation under these conditions also eliminates the problem of molybdenum lost to refractories, contamination of the product with refractories, and heavy maintenance required to repair the brick walls.

Because of the fine sizes, cohesive nature, and high angle of repose of the particles in the bed 46, it is necessary to vibrate the chamber 14 during fluidization to maintain desired levels of bed porosity and permeability and therefore eliminate sintering/fusion of the bed 46. Vibration of the chamber 14 can eliminate channeling (i.e., short circuiting) of fluidizing gas in the bed, knock off any solids build-up on the reactor walls and cooling tubes, and improve heat transfer. This improves bed fluidization and eliminates pockets of unfluidized material. For this reason, a vibrator 94 is connected externally to the chamber 14, and the entire chamber 14 is mounted on a number of flexible supports (not shown), such as springs, to provide the chamber 14 and attached components with freedom of motion. The vibrator 94 moves the entire chamber 14 back and forth in a substantially horizontal plane during fluidization. Although the design and size of the vibrator depend on the size of the roaster (which in turn depends upon the throughput rate), the vibrator is selected to provide a minimum amplitude of vibration of the chamber 14 of about $\frac{1}{16}$" and a maximum amplitude of about $\frac{1}{2}$".

The roaster 10 further includes a fluidizing gas handling system for fluidizing the bed 46. The fluidizing gas handling system includes one or more blowers/compressors (not shown), gas metering flowmeter (not shown), fluidizing gas preheaters 98*a–c*, and gas input and output lines. The fluidizing gas 70 preferably has an oxygen content of at least about 15 vol % with the preferred fluidizing gas being air. The preheaters 98*a–c* preferably heat the fluidizing gas 70 to a minimum temperature of about 300° C. and a maximum temperature of about 700° C. A separate preheater and flowmeter device is located upstream of each zone section of the plenum chamber 54. Preferred preheaters are electric or gas fired to permit precise control of the fludizing gas temperature. The preheaters are used during startup as well as to maintain the bed temperature, especially in the final zone 34C.

The off-gas 50 from the roaster is passed through a gas/particulate separator device 110 to form a treated off-gas 52. The gas/particulate separator device 110 can be any suitable device for removing entrained particulates from gases, with cyclones being most preferred. The removed particles are returned to the bed 46 and the treated off-gas 52 is conveyed to a gas scrubber. If necessary, an additional gas/particulate separator device can be used to further treat the off-gas to reduce further the entrainment of dust particles. These recovered particles are also returned to the bed 46.

The operation of the roaster 10 can be automated by a monitoring and control system. The monitoring and control system (not shown) can include thermocouples positioned at various locations in each zone to measure temperature, flowmeters in the fluidizing gas input lines to each zone to measure fluidizing gas flow rate, thermocouples positioned in the fluidizing gas input lines to each zone to measure fluidizing gas temperature prior to contacting of the bed, flowcontrollers positioned in the cooling fluid input lines for controlling flow rate, a feed controller for controlling feed material feedrate, and a control device, e.g., a central processor, for adjusting one or more of the fluidizing gas temperature or flow rate, cooling fluid flow rate, feed rate of the feed material, fluidized bed temperature to substantially optimize and control processing conditions.

The operation of the roasting apparatus will be described with reference to FIGS. 1–2. Although the feed material can be in any form, the description will be based upon the conversion of a concentrated feed material derived from mining a naturally occurring deposit.

As a primary concentrate formed from molybdenum ores or a byproduct concentrate formed from ores of other metals such as copper, the feed material can contain a variety of compounds. By way of example, the feed material can contain molybdenum sulfides, copper sulfides, rhenium sulfides, and iron sulfide. Preferably, the feed material has a molybdenum sulfide content ranging from about 50 to about 100 wt %, more preferably from about 75 to about 98 wt %, and most preferably from about 90 to about 95 wt %. In most applications, the feed material has a relatively fine particle size distribution. Preferably, the $P_{80}$ size of the feed material is no more than about 100 mesh (Tyler) and more preferably no more than about 150 mesh (Tyler) and most preferably no more than about 200 mesh (Tyler).

The feed material is supplied to the bed in the first zone 34 a via feed port 18. Fluidizing gas, preferably air, is preheated and supplied to the various sections of the plenum chamber 54. The fluidizing gas comprises preferably at least about 10 vol % molecular oxygen and more preferably at least about 20 vol % molecular oxygen. The fluidizing gas passes through the distributor plate 42 and oxidizes molybdenum sulfides and other sulfides in the feed material. The bed material passes sequentially from zone to zone via openings 58a,b in the baffles 30a,b separating the various zones 34a–c. The conversion rate of sulfides to oxides in the first zone 34a is higher than that in the second zone 34b, and the conversion rate in the second zone 34b is higher than that in the third zone 34c. The roaster off-gas 50 from the various zones 34a–c moves from the bed 46 to the upper portion 62 of the chamber 14 and then passes to the gas/particulate separation device 110. A portion of the entrained particles from the bed 46 fall from the gas as the velocity of the gas slows in response to the increased cross-sectional area of flow in the upper portion of the chamber 14. Any remaining entrained particles are removed by the gas/particulate separation device 110 and returned to the bed via the underflow pipe 114. The treated off-gas 52 leaves the gas/particulate separation device 110 for further treatment.

The preceding steps are repeated zone by zone as the feed material moves from the first zone 34a to the second zone 34b and from the second zone 34b to the third zone 34c and so on. In the last zone 34c, the bed material, which has now been fully oxidized to form the product, is removed from the roaster via discharge port 22.

As noted above, the operating conditions in each zone can be different from the operating conditions in other zones due to differences in the sulfide contents of the bed particles in each zone. By way of example, the bed particles in the first zone 34a commonly have a higher sulfide content than the bed particles in the second zone 34b, and the bed particles in the second zone 34b have a higher sulfide content than the bed particles in the third zone 34c and so on. The sulfide content of the partially oxidized material leaving the various zones 34a,b via openings 58a,b will depend upon the reactor design and operating conditions.

The fluidizing gas velocity can differ from zone to zone. The superficial velocity of the fluidizing gas in the initial (i.e., upstream) zones preferably ranges from about 10 to about 80 cm/sec and more preferably from about 20 to about 60 cm/sec to supply the desired amount of oxygen to the bed. During the final stages of roasting, the rate of sulfur removal drops and the continued use of a high fluidizing gas flow rate is undesirable, since it would reduce the sulfur dioxide concentration in the exit gas and remove heat from the bed where there is no significant heat generation. Accordingly, a higher fluidizing gas flow rate can be used in the initial zones than is used in the final (i.e., downstream) zones. The fluidizing gas superficial velocity in the later zones should be maintained low, preferably ranging from about 10 to about 40 cm/sec and more preferably from about 10 to about 30 cm/sec. This can be accomplished since air flow to each section of the plenum chamber can be controlled separately.

Under the operating conditions described above, the roasting reaction typically requires at least about 2 hours but no more than about 8 hours and more typically is completed in about four to five hours. Depending upon the gas flow rate and oxygen content used during the initial stages of roasting a majority of the sulfur can be removed in the first hour. The time required for the final zones is mainly dependent upon the final desired sulfur content of the product.

Figure 3:
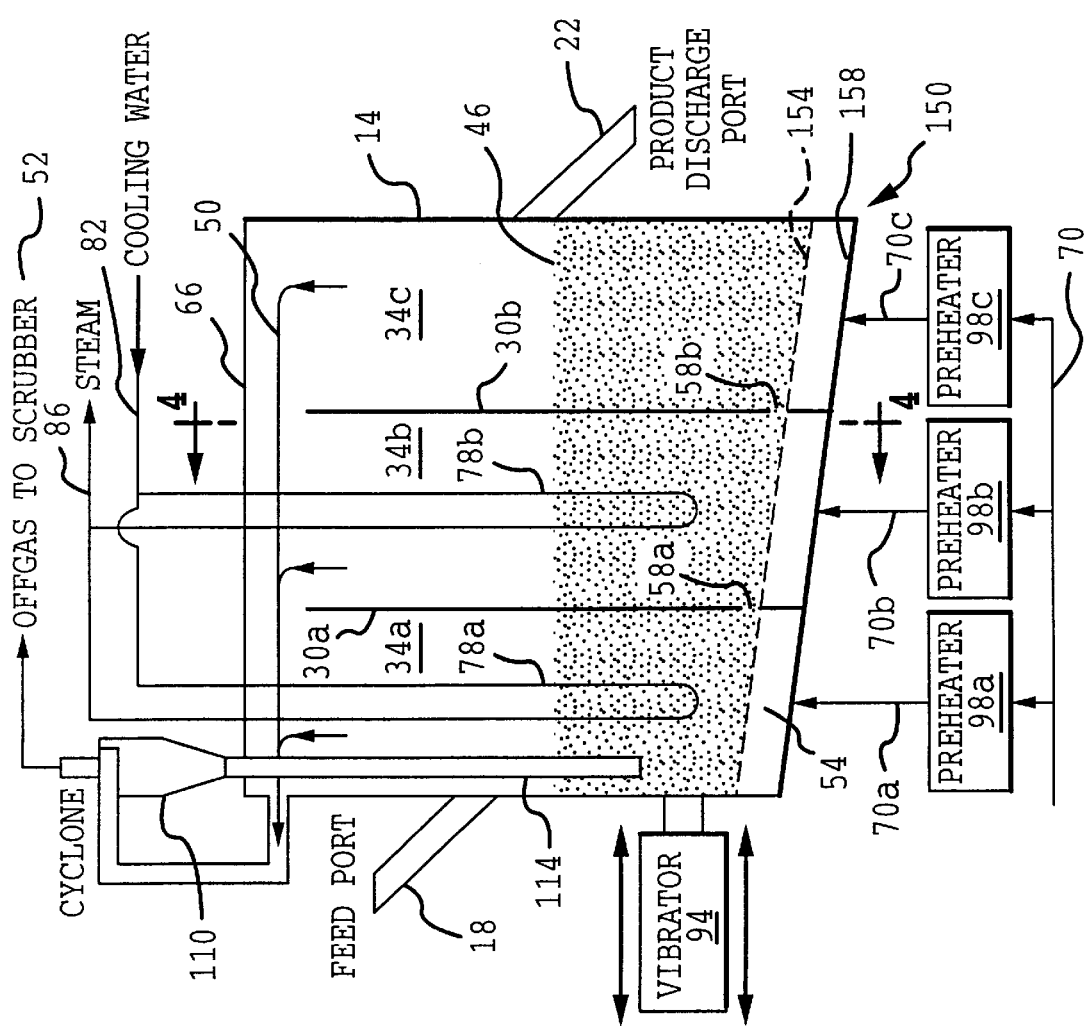
FIG. 3 is a cross-sectional view of another embodiment of a fluidized bed roaster according to the present invention taken along line 3—3 of FIG. 4.

FIGS. 3 and 4 depict a further embodiment of a fluidized bed roaster according to the present invention. The roaster 150 is substantially identical to the roaster 10 of FIGS. 1 and 2 with the exception that the distributor plate 154 and bottom panel 158 of the chamber 14 are inclined relative to the horizontal. The slope of the distributor plate 154 provides for variable residence times of the bed material (and fluidizing gas) in each zone by causing the depth of the bed 46 to vary substantially continuously along the length of the distributor plate 154. Thus, the bed depth at the input end of the chamber 14 is less than the bed depth at the discharge end of the chamber 14. Likewise, the bed depth in the first zone 34a is less than the bed depth in the second zone 34b and the bed depth in the second zone 34b is less than the bed depth in the third zone 34c. In this manner, the sloping distributor plate 154 causes a residence time of the bed particles (and the retention time of the fluidizing gas) to increase as the particles move from zone to zone towards the discharge end of the roaster. The residence time of the particles in the first zone 34a (and retention time of the fluidizing gas) is less than the residence time of the particles in the second zone 34b (and retention time of the fluidizing gas) and the residence time of the particles in the second zone 34b (and retention time of the fluidizing gas) is less than the residence time of the particles in the third zone 34c (and retention time of the fluidizing gas).

Alternatively, the distributor plate 154 can provide variations in residence time by being stepped rather than sloped.

In this design, the distributor plate 154 can be stepped zone-by-zone to provide for increasing bed depth as particles move from the feed end to the discharge end of the chamber. In either case, the greater gas retention time and residence time during the later stage of roasting when the reaction is slowest is highly advantageous. It maximizes the utilization of the oxygen in the air and the plant capacity rate, per square foot of hearth area, while producing a low-sulfur product. As will be appreciated, a fluidized bed reactor with level (no slope or steps) but longer hearth can also be used to provide extra residence time to complete the roasting process.

EXAMPLES

The following examples are provided for illustrative purposes. They are not intended to limit the scope of the invention as described above and in the claims.

Example 1

Two byproduct molybdenite concentrates, one high grade containing about 92 percent $MoS_2$ and the other low grade containing about 80 percent $MoS_2$, were blended in 4:1 weight proportion. This blend was used as the feedstock in both the bench-scale batch tests and pilot-scale continuous tests. The chemical and physical characteristics of this feedstock are summarized below:

| Chemical Analyses (weight percent) | |
| --- | --- |
| Molybdenum | 53 |
| Sulfur | 37 |
| Copper | 1 |
| Iron | 1.5 |
| Calcium | 0.3 |
| Rhenium | 500 ppm |
| Insoluble | 7 |
| Particle Density | 4.71 g/cc |
| Bulk Density | 1.4 g/cc |

| Particle Size Distribution | |
| --- | --- |
| Diameter (Microns) | Cumulative Percent Finer |
| 80 | 95.4 |
| 60 | 89.8 |
| 40 | 75.5 |
| 20 | 43.1 |
| 10 | 19.2 |
| 5 | 8.0 |

Example 2
Batch Fluidized-Bed Roasting

A byproduct molybdenite concentrate of the composition given in Example 1 and containing approximately 0.7% residual flotation oil and 0.6% moisture was roasted in a vibratory bench scale cylindrical fluidized-bed reactor in a batch mode. Prior to roasting, 1,000 grams of the concentrate was charged to the reactor and the reactor was sealed. To initiate the roasting reaction, fluidizing air was passed through the reactor at 19.5 lpm (standard liters per minute) while the external walls were heated to between 500° C. and 600° C. As the temperature of the fluidized bed of molybdenum sulfide concentrate passed (nominally) 420° C., the rate of temperature rise increased indicating an exotherm within the reactor. As the temperature within the fluidized bed passed (nominally) 480° C., the exotherm caused a rapid temperature increase and immediate temperature control was established by passing cooling water through a coil located within the fluidized bed. At that time, the auxiliary external furnace was turned off to prevent overheating of the bed material.

Throughout the roasting reaction, the temperature of the fluidized bed was controlled between 550° C. and 560° C. during which the bed was gradually converted from molybdenum disulfide to molybdenum trioxide. After approximately 140 minutes, the reaction exotherm subsided and the cooling water was turned off while the auxiliary external furnace was turned back on to hold the fluidized-bed temperature above 550° C. It can be appreciated that although the exotherm had subsided, it was necessary to hold the bed at temperature for an additional 60 minutes to allow removal of the last remaining sulfur.

Analysis of the reactor off-gas during the roasting reaction showed a sharp increase in the sulfur dioxide concentration to approximately 12.5% when the reaction exotherm started and a gradual decrease to 10% at the point when the exotherm subsided. At this point, the sulfur dioxide concentration dropped to roughly 5% and then steadily decreased to zero during the 60 minute hold period, thus indicating all of the residual sulfide had been fully roasted to oxide.

Example 3
Batch Fluidized-Bed Roasting Utilizing Oxygen Enriched Air

Another batch-wise fluidization test was conducted as described in the previous example with the exception that 1,200 grams of molybdenite concentrate was charged to the reactor and once the exotherm was established, oxygen was mixed with the fluidizing air to achieve a fluidizing gas containing 37% oxygen. During the exotherm, which lasted in this case for 168 minutes, the sulfur dioxide concentration in the off-gas rose to a high of 26% and remained fairly constant until the exotherm subsided. The concentration then dropped steadily to zero over the next 62 minutes until the test was terminated.

The use of oxygen enrichment of the fluidizing air will result in increased commercial production rates for a fixed-size fluidized-bed roaster.

Example 4
Continuous Fluidized-Bed Roasting

A byproduct molybdenite concentrate containing approximately 90% molybdenum disulfide, 1.5% iron, 1.0% copper, 0.3 % Ca, 0.7% residual flotation oil and 0.6 % moisture was roasted in a vibratory pilot-scale three-zone continuous fluidized-bed reactor of the type described hereinbefore by continuously feeding the concentrate at a rate of 8 lb/hr while passing fluidizing air through the reactor at nominally 10 scfm. The temperature of the fluidized bed, comprised of a mixture of molybdenum sulfide plus molybdenum oxide, was controlled between 500° C. and 560° C. by passing cooling water through coils located within the fluidized bed.

Molybdic oxide product was removed from the reactor at approximately 7 lb/hr after a nominal 3-hour residence time via a water-cooled overflow-type discharge port, The rate of product discharge was proportional to the feed rate taking into account the stoichiometric weight change due to the conversion of molybdenum sulfide to molybdenum oxide. The exhaust gas leaving the reactor was continuously analyzed and found to contain 6–8% sulfur dioxide. Upon leaving the reactor, the off-gas, which also contained low levels of volatile rhenium oxide and a significant quantity of carry-over fines (small particle size bed material) was passed through primary and secondary hot cyclones which returned greater than 99% of the fines back to the reactor.

The reactor off-gas was then passed through a wet vortex-type scrubber which removed residual particulate solids and the water-soluble volatile rhenium oxide. Prior to discharge to the atmosphere, the sulfur dioxide in the off-gas was removed by contact with a caustic solution in a packed-tower scrubber.

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for converting molybdenum sulfides into molybdenum oxides, comprising:

introducing a feed material comprising molybdenum sulfides into a fluidized bed of particulate solids contained within a fluidized bed reactor, the fluidized bed being separated into a plurality of different zones with adjacent zones being separated by a baffle with an opening between the adjacent zones such that the material flows through the fluidized bed reactor in plug flow mode;

contacting the particulate solids of the fluidized bed, including the feed material, with an oxygen containing fluidizing gas while vibrating the fluidized bed reactor, to convert at least a portion of the molybdenum sulfides into molybdenum oxides and thereby form a product comprising mnolybdenum oxides;

maintaining a fluidized bed temperature in a range of from about 400° C. to about 580° C., comprising (i) cooling at least a portion of the particulate solids in at least a first zone of the fluidized bed, during the contacting step, with cooling means for removing heat from the first zone of the fluidized bed to maintain a fluidized bed temperature in the first zone of no more than about 580° C., the cooling means being submerged in the fluidized bed during the cooling step, an cd (ii) heating at least a portion of the particulate solids in at least a second zone of the fluidized bed to maintain a fluidized bed temperature in the second zone of at least about 400° C.;

wherein, the particulate solids in the first zone have a higher sulfide content, than the sulfide content of the particulate solids in the second zone, and exothermic reaction of the sulfides in the first zone produces excess heat in the first zone and heat is removed from the first zone by the cooling to maintain the temperature in the first zone within the range;

wherein, the particulate solids of the second zone have a lower sulfide content, than the sulfide content of particulate solids in the first zone, and exothermic reaction of sulfides in the second zone produces insufficient beat in the second zone and heat is added to the second zone by the heating to maintain the temperature in the second zone within the the range; and removing product comprising the molybdenum oxides from the fluidized bed reactor.

2. The method of claim 1, wherein the feed material has a $P_{80}$ size of no more than about 100 mesh (Tyler).

3. The method of claim 1, wherein the feed material has a molybdenum sulfide concentration of at least about 50 wt %.

4. The method of claim 1, wherein at least about 95% of the molybdenum sulfides in the feed material are converted into molybdenum oxides during the contacting step.

5. The method of claim 4, wherein the method is conducted substantially in the absence of recycle of the particulate solids.

6. The method of claim 1, wherein the product comprises no more than about 5 wt % molybdenum sulfides.

7. The method of claim 1, wherein the product is in the form of a free-flowing particulate material.

8. The method of claim 1, wherein the amplitude of vibration of the fluidized bed reactor ranges from about $1/16$ inch to about ½ inch.

9. The method of claim 1, wherein the fluidizing gas comprises at least about 10 vol % oxygen.

10. The method of claim 1, wherein the contacting step comprises:

contacting a first portion of the feed material with a first fluidizing gas in the first zone of the fluidized bed to convert a first portion of the molybdenum sulfides to molybdenum oxides; and contacting a second portion of the feed material with a second fluidizing gas in the second zone of the fluidized bed to convert a second portion of the molybdenum sulfides to molybdenum oxides.

11. The method of claim 10, wherein the first and second zones are separated by a baffle with a relatively small opening such that the material flows from the first zone to the second zone in a plug flow mode.

12. The method of claim 10, wherein the oxygen content of the first fluidizing gas is greater than the oxygen content of the second fluidizing gas.

13. The method of claim 10, wherein the flow rate of the first fluidizing gas is greater than the flow rate of the second fluidizing gas.

14. The method of claim 10, wherein the fluidized bed depth in the first zone is less than the fluidized bed depth in the second zone and the residence time in the first zone is less than the residence time in the second zone.

15. The method of claim 1, wherein the feed material is comprised substantially entirely of molybdenite concentrate.

16. The method of claim 1, wherein at least a portion of the fluidizing gas is preheated prior to introduction into the fluidized bed.

17. The method of claim 1, wherein the residence time of the particulate solids in the fluidized bed is no longer than about 8 hours.

18. The method of claim 1, wherein the fluidized bed has a top and a bottom and the baffle extends from the top of the fluidized bed to the bottom of the fluidized bed.

19. The method of claim 1, wherein the fluidized bed is located in a lower section of the fluidized bed reactor, the fluidized bed reactor further comprising an upper section located above the fluidized bed, the upper section having a larger width than the lower section, so that the velocity of the fluidizing gas decreases as the fluidizing gas flows from the lower section into the upper section.

20. The method of claim 19, wherein the upper section is in fluid communication with at least one separation device which removes entrained particles from the upper section and returns the entrained particles to the fluidized bed.

21. The method of claim 1, wherein the cooling means comprises a cooling tube submerged in the fluidized bed, the cooling comprising passing a cooling fluid through the cooling tube to remove heat from the fluidized bed.

22. The method of claim 1, wherein the first zone and the second zone are in fluid communication via a space in the fluid bed reactor located above the top of the baffle.

23. The method of claim 1, wherein the fluidized bed includes at least three zones with the second zone being the last in series of the at least three zones.

24. The method of claim 23, wherein delivery of the fluidizing gas to each of the plurality of zones is controlled separately, and the fluidizing gas delivered to at least the second zone is preheated prior to introduction into the second zone.

* * * * *

UNITED STATES PATENT AND TRADEMARK OFFICE
CERTIFICATE OF CORRECTION

PATENT NO. : 6,190,625
DATED : February 20, 2001
INVENTOR(S) : JHA et al.

It is certified that error appears in the above-identified patent and that said Letters Patent is hereby corrected as shown below:

At Column 11, line 35, please delete "an cd" and insert therefor --and--.

Signed and Sealed this

Fifth Day of June, 2001

Attest:

Attesting Officer

NICHOLAS P. GODICI
*Acting Director of the United States Patent and Trademark Office*